United States Patent [19]

Jacobson

[11] 4,170,341

[45] Oct. 9, 1979

[54] AIRCRAFT PARCEL-PICKUP MECHANISM

[76] Inventor: Darwin J. Jacobson, P.O. Box 962, Port Angeles, Wash. 98362

[21] Appl. No.: 879,365

[22] Filed: Feb. 21, 1978

[51] Int. Cl.$^2$ ............................................. B66D 1/48
[52] U.S. Cl. ................................. 254/172; 244/137 R
[58] Field of Search ................... 254/173 R, 172, 189; 244/137 R, 136, 118 R; 258/1.2; 89/1.5 C; 198/750, 483, 484

[56] References Cited

U.S. PATENT DOCUMENTS

| 3,176,940 | 4/1965 | Echeverria, Jr. ................ 244/137 R |
| 3,379,096 | 4/1968 | Gillham et al. .................. 244/137 R |
| 4,017,042 | 4/1977 | Jacobson .......................... 244/137 R |

*Primary Examiner*—Robert J. Spar
*Assistant Examiner*—Kenneth W. Noland

[57] ABSTRACT

This aircraft parcel-pickup device provides for the pickup of a parcel on the ground by an aircraft in flight. A power unit is provided to pay out parcel-pickup cords from a first sheave and to tension a first spring cord reeving onto a second sheave, the two sheaves being connected together and one reeving on spring cord while the other is reeving off parcel-pickup cord. A manually operable pawl and ratchet is provided to prevent the parcel-pickup cords from reeving in, after being selectively extended, to facilitate engaging the parcel by a hook carried by parcel-pickup cords. After such engagement, the resilient first spring cord compensates for the shock of contact between moving and nonmoving members and thereafter draws the parcel-pickup cord and the parcel to the aircraft. The spring cord is provided with a governor to limit the speed of travel of the parcel as it nears the aircraft. The governor is powered in one direction of travel by connections with the returning parcel-pickup cord and during such travel a second spring cord is being tensioned and powers the governor in its travel in the opposite direction. The parcel-pickup cord is constructed to bend forward and to resist bending in the opposite direction.

15 Claims, 14 Drawing Figures

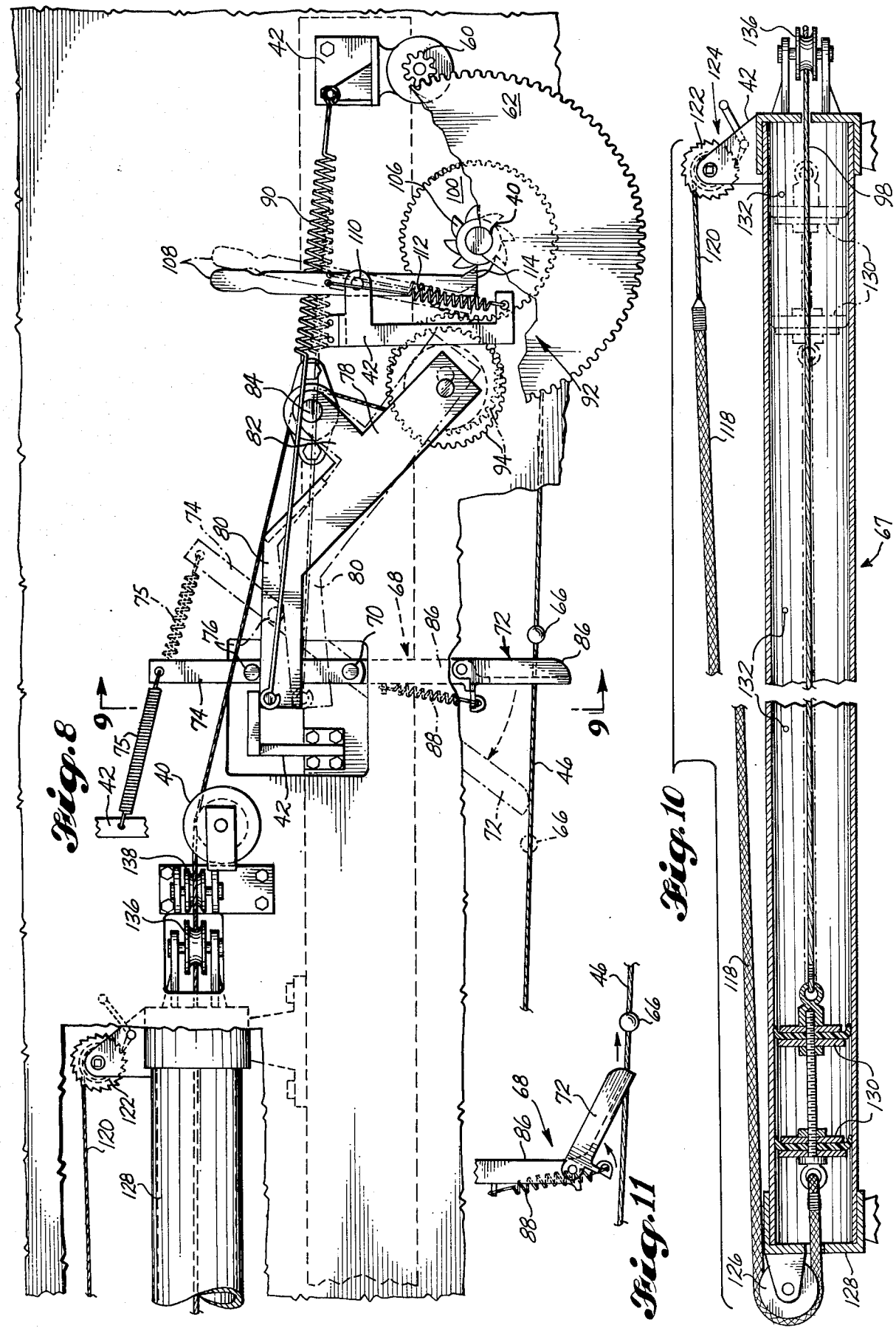

AIRCRAFT PARCEL-PICKUP MECHANISM

BACKGROUND OF THE INVENTION

The only prior art known to applicant having any pertinency whatsoever to the present invention are the following issued U.S. Pat. Nos. 1,621,654, 2,470,120, 3,331,572, 3,883,097, 1,851,305, 2,481,280, 2,505,707, 3,167,303, 3,371,874.

In general, such prior art patents do not disclose the picking up of a stationary parcel by an aircraft in flight by means following the teaching of my invention.

SUMMARY OF THE INVENTION

My invention provides for a parcel-pickup cord having a parcel-engaging hook at its outer end portion. This parcel-pickup cord is reevable onto and off of first sheave means. The first sheave means is driven in a given direction by any suitable means and while so driven, pays out or parcel-pickup cord is reeved off said first sheave. A second sheave is connected with said first sheave to turn therewith, as both are mounted on the same cross shaft which is power driven in one direction. A first spring cord means has one end portion connected with said second sheave and is wound thereon as both said sheaves turn in said given direction. The first spring cord has its other end portion connected with frame parts of the aircraft and the first spring cord is tensioned as it reeves onto said second sheave and such tensioned first spring cord furnishes the power to drive the two sheaves in the opposite direction while the said first spring cord reeves off its sheave and the parcel-pickup cord reeves onto its sheave. As the hook end portion of the parcel-pickup cord and the parcel carried thereby nears the aircraft, governor means are engaged to limit the speed of travel of such end portion of the parcel-pickup cord and such parcel. The moving parts of the governor are connected with a second spring cord means which is tensioned by the travel of the parcel-pickup cord connected with the moving part of the governor. After a parcel has been delivered to the aircraft and removed from the hook end portion of the parcel-pickup cord, the second spring cord means furnishes the power to return the moving parts of the governor to the starting position for its next cycle of operation. Manually controlled pawl and ratchet means are provided to prevent the first spring cord means from returning parcel-pickup cord at the time when a package is being engaged so a pilot can maneuver the aircraft to engage a suspended hook, relatively fixed as respects the aircraft, with a stationary package on the ground. The pawl and ratchet means limit travel of the parcel-pickup cord only in one direction of travel thereof and thus resilient cord, which can pay out, engages a stationary parcel and the give will allow for a cushion to take care of the sudden shock of contact and of the increase in speed until the suspended package moves faster than the aircraft and is thereby delivered to the aircraft. Also, the parcel-pickup cord is so constructed that it readily bends in a forward direction of the line of travel of the aircraft but resists bending in the opposite direction.

The foregoing and other objects of my invention will become implicit and explicit as the description of my invention proceeds in connection with the accompanying specification and drawings, wherein like reference numerals refer to like parts.

BRIEF DESCRIPTION OF THE DRAWINGS

FIG. 8 is a fragmentary elevational view, on a still larger scale, taken substantially on broken line 8—8 of FIG. 7;

FIG. 9 is a fragmentary elevational view, with parts in section, and taken substantially on broken line 9—9 of FIG. 8;

FIG. 10 is a fragmentary sectional view of a lineal-travel-speed-limiting device, or governor, and parts of associated cords employed in arresting speed of the parcel-pickup cord and package as they approach the aircraft;

FIG. 11 is a fragmentary elevational view of a lever and associated ball-carrying cord employed in connection with the mechanism of FIG. 10;

FIG. 12 is a fragmentary side elevational view of the parcel hook, on a larger scale, and taken substantially on broken line 12—12 of FIG. 7;

FIG. 13 is a fragmentary elevational view, on a still larger scale, of a parcel-pickup cord; and FIG. 14 is a fragmentary perspective view, on a still larger scale, of a fragment of the cord shown in FIG. 13.

DESCRIPTION OF A PREFERRED EMBODIMENT

In FIGS. 1–5, an aircraft 20 is shown as equipped with the parcel-ejector means 22 of my prior U.S. Pat. No. 4,017,042 shown in place. My said prior patent dealt with the ejection or delivery of a parcel from an aircraft in flight to the ground, whereas, the present invention generally relates to the picking up from the ground of a parcel by an aircraft in flight.

Figure 1:
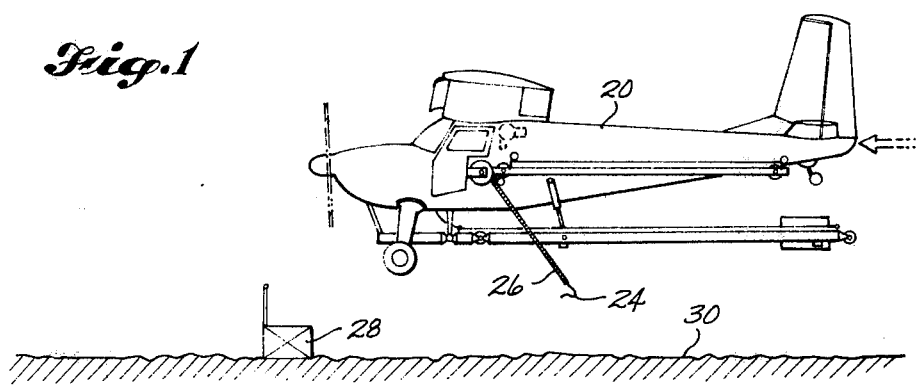
FIG. 1 is a view of an aircraft, equipped with my invention, approaching a parcel on the ground, and just prior to the picking up of said parcel.
Figure 2:
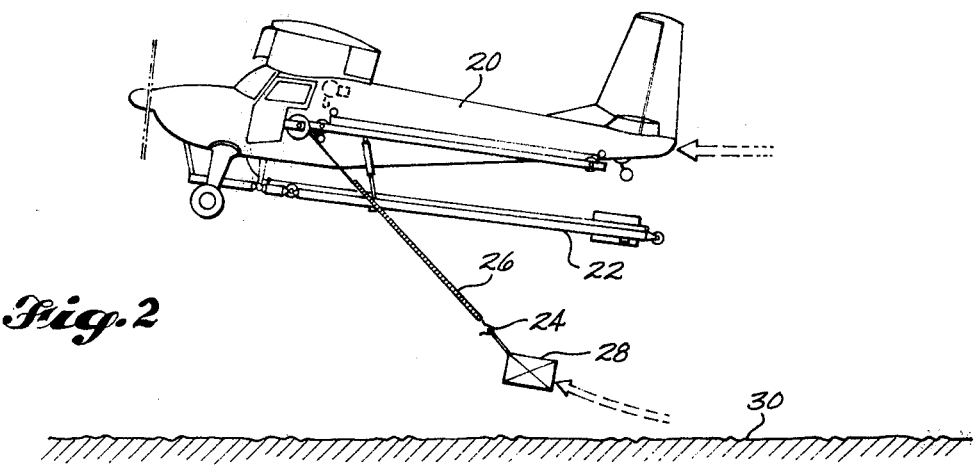
FIG. 2 is a similar view and just after the picking up of the parcel.
Figure 3:
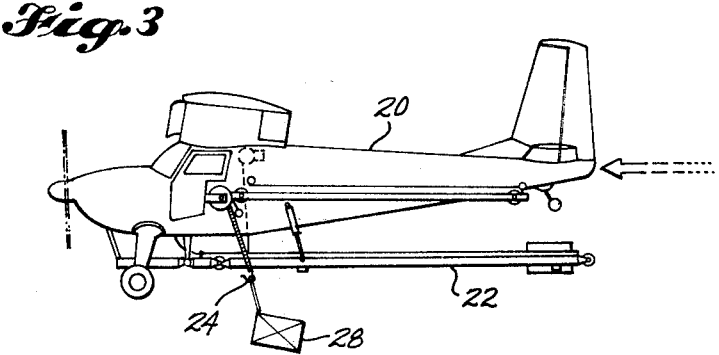
FIG. 3 is a similar view showing the parcel pulled toward the aircraft and just prior to being engaged by a hoist for the transfer of the parcel to the aircraft.

A hook 24 and parcel-pickup cord 26, the details of which will be later described, engage a parcel 28 resting on the ground 30 in FIG. 1 and move such parcel toward the aircraft 20 as shown in FIGS. 2 and 3. When the parcel reaches the position shown in FIG. 3, a power-driven hoist 32, connector 34, and second hook 36 (see FIG. 5) engage the parcel 28, release the hook 24 from the parcel 28, and deliver the parcel 28 into the aircraft 20.

There are two parcel-pickup cords 26, see FIGS. 6 and 7, one on each side of the aircraft 20 and they are reeved onto and off of spaced apart sheaves 38 as will be later explained. Each sheave 38 is fixed to a cross shaft 40, which is journaled in appropriate bearings carried by the aircraft frame parts 42. Thus, as shaft 40 turns in one direction, as clockwise as viewed from the bottom of FIG. 7, parcel-pickup cord 26 is paid out from each sheave 38, and when said shaft 40 is turned in the opposite direction, parcel-pickup cord 26 is reeved onto each sheave 38.

A helical sheave 44 is also fixed on cross shaft 40. This illustrates a manner of providing travel of sheaves 44 and 38 at the same time. Cord 46 has one end portion thereof connected to sheave 44 and is thence reeved onto sheave 44 in the opposite direction to the reeving on of parcel-pickup belts 26 onto sheaves 38-(clockwise as viewed from the bottom of FIG. 7). Thus, turning of shaft 40 in one direction reeves cord 46 onto sheave 44 and turning in the opposite direction reeves cord 46 off sheave 44. With such direction of reeving, parcel pickup cord 26 is reeved off as cord 46 is reeved on and vice versa. Cord 46 has its other end connected with one end of spring cord 48 and the other end of spring cord 48 is connected with a second cord 50 which, in turn, connects with the power-driven sheave means 52. Cord 46, spring cord 48, and second cord 50 form a spring cord means. The purpose of nonspring cord parts 46 and 50 to utilize space on sheaves as such cord parts are reeved thereon. Spring cord 48 is reeved over a plurality of idle pulleys 54 and 56 to give it the desired length. The spring cord 48 is used as power means to reeve in the parcel-pickup cords 26 onto sheaves 38 and hence, the plurality of idle pulleys 54 and 56 and the reeving of spring cord 48 back and forth over the same, provides sufficient length of spring cord 48 so that during its retraction after being appropriately stretched, it is long enough and provides the desired power and for a sufficient time duration to bring the hook 24 and parcel 28 to the aircraft 20. The spring cord 48 is initially pretensioned by power-driven sheave means 52. Thereafter, when parcel-pick-up cords 26 are fed out, the spring cord 48 is sufficiently tensioned to return the parcel-pickup cords 26 to their position shown in FIG. 7 of the drawing and in which position the spring cord 48 is at its pretensioned position urging a parcel-pickup cord 26 to the position shown in FIG. 7 of the drawings.

The position of the sheaves 38 and 44 (shown in FIG. 7) is the rest position after a parcel has been drawn to the aircraft 20. Thereafter, if cross shaft 40 is driven (clockwise as viewed from the bottom of FIG. 7), a parcel-pickup cord 26 is fed out from each sheave 38 and at the same time cord 46 is reeved onto helical sheave 44. At this time, the total diameter of each sheave 38 with parcel-pickup cord 26 thereon to its greatest diameter and at the same time cord 46 is being fed from helical sheave 44 and with the largest diameter of helical sheave 44. Thus, feed off and onto sheaves 38 match the feed onto and off of helical sheave 44.

The shaft 40 is turned in one direction (counterclockwise as viewed from the bottom of FIG. 7) by spring cord 48 returning to normal after being stretched and this causes parcel-pickup cords 26 to be reeved onto sheaves 38 and hook 24 and parcel 28 to move to the aircraft 30. Movement in the opposite direction or clockwise of cross shaft 40 is caused by motor 58. Movement of the cross shaft 40 in this clockwise direction pays out parcel-pickup cords 26 and hook 24 to the position indicated in FIG. 1 of the drawings.

Meshing gears 60 and 62 (FIG. 7) are carried, respectively, by the rotor of motor 58 and cross shaft 40 transmitting power from motor 58 to cause cross shaft 40 to turn and in said clockwise direction. Shaft 40 operates as a continuous shaft and coupling 64 shown is employed only as a mechanical expedient.

As parcel 28 is being moved toward aircraft 20 by parcel-pickup cords 26 being reeved onto sheaves 38, cord 46 is being paid off of helical sheave 44 and cord 46 moves toward the left as viewed in FIG. 8. When ball 66, carried by cord 46, engages leverage 68, a linealtravel-speed-limiting device numbered generally 67 (hereinafter termed a speed governor) connected with leverage 68, operates to counteract the thrust provided by the resiliency of spring cord 48 (which is reeved about sheaves 38 and returning the parcel-pickup cords 26) and thus the governor 67 cushions the delivery of the parcel 28 as the same nears the aircraft 20.

Leverage numbered generally 68 (FIGS. 8 and 9) comprises a crankshaft mechanism with main shaft 70, lever means 72 at right angles to shaft 70 and disposed on one end portion of main shaft 70, link 74 disposed on the other end portion of main shaft 70 and disposed at right angles to said main shaft 70 and parallel to the lever means 72, and shaft 76 disposed at right angles to link 74 and parallel to shaft 76. Thus, if the ball 66 engages with lever means 72 (the details of which will be later described), it will move lever means 72 from the full line to the dotted line position shown in FIG. 8 of the drawings and will also move the shaft 76 from the full line to the dotted line position shown in FIG. 8. Shaft 76 will engage with the upper extension of generally H-shaped linkage (see FIGS. 8 and 9) comprising parallel legs 78 having extensions 80 (angularly disposed to legs 78 as shown in FIG. 8). Each of the legs 78 has a lug or right angle portion 82 which are spaced apart and pivotally mounted on cross shaft 84. Shafts 70 and 84 are suitably supported by bearings carried by aircraft frame parts 42.

Lever means 72 has its sleeve 85 slidably mounted on shaft 70 so it may move lengthwise of shaft 70 but said sleeve 85 angularly moves with said shaft 70 to impart its angular movement to said shaft 70. The lengthwise sliding movement of lever means 72 permits lever means 72 to follow cord 46 as the same moves sideways in reeving onto and off of helical sheave 44. Spring means 75 connects link 74 with an aircraft frame part 42. This tends to turn link 74 counterclockwise (in FIG. 8) about shaft 70 and lever means 72 in the same direction or toward its full line position—thus tending to maintain contact between lever means 72 and cord 46 even though lever means 72 may be in the dotted line position shown in FIG. 8.

Lever means 72 (FIG. 8) preferably comprises links 86 pivotally connected together and spring loaded by spring 88 so the parts will assume the positions shown in FIG. 8 but the parts can give in moving from the dotted line to the full line position of FIG. 11 in response to being moved by ball 66 carried by cord 46. Also, the member, comprising legs 78, extension parts 80, and legs 82, mounted on cross shaft 84, is provided with off-center spring 90, connected between it and an aircraft frame part 42, so that such member is maintained either in the position with the legs 78 in the full or the dotted line position shown in FIG. 8.

The legs 78 support a sheave-gearlike assembly numbered generally 92 comprising gearlike members 94 carrying sheave 96. Nonelastic cord 98 is reeved off and onto sheave 96, which turns with gearlike members 94. When lever means 72 is moved (to the left in FIG. 8) from the full line to the dotted line position, shaft 76 engages with extension 80 and moves legs 78 (about shaft 84 as a fulcrum) and moves gearlike members 94 into engagement with gearlike member 100 (FIG. 8). Gearlike members 94 and 100 may be formed of a rubberlike material with cogs therein—this io prevent relative slippage therebetween when the same are engaged and also to eliminate gear-engaging and -releasing problems inherent in metal gear usage. Also, the off-center spring 90 maintains the gearlike members 94 either in engagement or disengagement with gearlike member 100.

Shaft 40 also carries ratchet gear 106 (FIG. 8). Lever 108 is pivoted on a frame part 42 intermediate its length by pivot 110. An off-center spring 112 with its pawl 114, either in engaging position with ratchet gear 106 or out of the path of said ratchet gear 106, will maintain lever 108 in either position. When pawl 114 engages ratchet gear 106, shaft 40 is free to turn counterclockwise (as viewed in FIG. 8) but such shaft 40 is locked against clockwise movement. Counterclockwise movement of shaft 40 as viewed in FIG. 8 is the same direction of movement as clockwise movement of shaft 40 as viewed in FIG. 7 and thus when the shaft 40 is locked, sheaves 38 are prevented by pawl 114 from reeving in parcel-pickup cord 26 when the pawl 114 is in its full line or locking position as shown in FIG. 8. The lever 108 is placed in full line position just prior to the pickup of a parcel (FIG. 1) to maintain the parcel-pickup cords 26 in any extended lengths thereof. Once a parcel 28 is engaged, the impact of engaging a stationary parcel 28 by a moving hook 24 will cause reeving off of parcel-pickup cord 26, reeving on of cord 46, turning of gearlike member 100, and finally ratchet gear 106 will turn relative to pawl 114. This will cause lever 108 to move from the full line to the dot line position of FIG. 8 and the ratchet gear 106 and cross shaft 40 are free to turn. Lever 108 also has an off-center spring 112 and thus it will remain either in its full line or dotted line position shown in FIG. 8 until its position is changed by the aircraft operator or by engagement of the hook 24 with a parcel 28 as previously described.

A second spring cord 118 is provided. This cord 118 and the spring cord 48 are like the spring and elastic cords 52 and 66 described in my said previous patent. This spring cord 118 is employed to return the moving parts of the governor device 67 (next described) after it has cushioned the delivery of a parcel 28 by cushioning the action of spring cord 48. One end of the parcel cord 118 (FIG. 10) is connected with a cord 120, which, in turn, is connected with and then reeved onto a sheave 122, which is supported by an aircraft frame part 42. Sheave 122 is provided with a pawl and ratchet mechanism 124 so that second spring cord 118 can be pretensioned. Spring cord 118 is reeved over pulley 126 (FIGS. 7 and 10) carried by a cylinder member 128. Within cylinder member 128, a piston member 130 is slidably mounted. Adjustable valves or port 132 allow air to escape at regulated amounts and thus regulate the speed of travel of the piston 130 in the cylinder member 128. A second nonflexible cord 98 connects with the other end of piston member 130 and cord 98 passes over guide pulley 136 (see to the extreme right of FIG. 10 and toward the left of FIG. 7). Thence, second cord 98 is guided by idle pulleys 138, 140, and 142 to and is then reeved about sheave 96 (FIGS. 7 and 9).

The second spring cord means preferably comprises nonelastic cord 120, second spring cord 118, and nonelastic cord 98. The first spring cord means preferably comprises nonelastic cord 46, first spring cord 48, and nonelastic second cord 50. The reason for providing said spring cord means with nonelastic and elastic parts is that the nonelastic parts facilitate winding of the cord onto drums. The elastic parts of the first and second cord means are employed to provide the desired length of elastic tension. Thus, a plurality of pulleys are shown and the cords are woven back and forth and if it is desired to increase the amount of elasticity and minimize the space involved, each of the spring cords may comprise a plurality of elastic members rather than the single elastic members shown.

Ball 66 (connected with cord 46) moves lever means 72 and causes gearlike members 94 to engage with gearlike member 100. This is at a time when it is desired to limit the speed of travel of the parcel-pickup cords 26 moving toward the aircraft 20. The travel of cross shaft 40 (which is being impelled by reason of the tensioned spring cord 48) causes sheave 96 to reeve in cord 98. Cord 98 is connected with second spring cord 118 and to piston-cylinder means 128, 130. Thus, the speed of travel of the spring cord 48 is governed by the second spring cord 118 while the latter is being tensioned and by the regulation of the air flow out adjustable ports 132. At the same time, the stretching of the second spring cord 118 (plus the pretensioning thereof by pawl and ratchet means 124) provides the power to return the governor means 67 to its initial starting position after it completes its speed-limiting action in connection with the reeving of parcel-pickup cords 26 onto sheaves 38. In order to return the moving parts of the governor 67 to their starting position after a parcel 28 has been delivered to aircraft 20, it is only necessary to disengage gearlike members 94 and 100 from each other by suitable lever means (not shown).

Due to the construction of the hook 24, the same releases itself from a parcel 28 after parcel-pickup cords 26 and hook 24 deliver the parcel 28 to the aircraft 20. Hook 24 (see FIGS. 7 and 12) has two bars 144 which connect between parcel-pickup cords 26 and support a rod 146 on which is hinged U-shaped hook member 148. Thus, after a hooked parcel 28 has been engaged by second hook member 36 and is lifted toward aircraft 20, the U-shaped hook 148 may pivot about rod 146 and be released from a parcel 28 being moved toward the aircraft by parcel-delivery means 22 and the hook 24.

To cause the parcel-pickup cords 26 to tend to lie in a substantially straight downward path, they are constructed (see FIGS. 13 and 14) of individual blocks 150, each of which is secured to a belt 152 at one face of each block. The opposite face of each block is slidably connected by a staple 154 to a cord 156. Thus, a parcel-pickup cord 26 may bend by blocks 150 separating at their rearward edges (rearward in the direction of travel of the aircraft 20) but not at their forward or opposite edges. This is illustrated in FIG. 13 of the drawings. Also, a weighted pulley 158 (FIGS. 5 and 6) depends from a pivoted arm 160 which has a force component urging the depending parcel-pickup cords 26 forwardly as is best illustrated in FIG. 6 of the drawings.

In picking up a parcel 28, the pilot of the aircraft 20 first pretensions spring cords 48 and 118 or checks to determine that such spring cords have been pretensioned. Spring cord 48 is pretensioned by operating power-driven sheave means 52. Spring cord 58 furnishes the power to bring a parcel 28 to the aircraft 20. Second spring cord means 118 is pretensioned by operating pawl and ratchet means 124. Second spring cord 118 provides the power to return the moving parts of the governor 67 to their starting position or to return piston member 130 to its starting position. Then the pilot causes motor 58 to turn and drive cross shaft 40.

This causes parcel-pickup cord 26 to be paid out and the hook member 24 to be lowered to the position shown in FIG. 1. By proper positioning of the aircraft 20 and the hook 24 relative to a parcel 28 on the ground 30, the hook 24 will engage a parcel 28 as is illustrated in FIG. 2. At this time, the lever 108 is in its full line position shown in FIG. 8 preventing the parcel-pickup cord 26 from being reeved onto sheaves 38. The impact resulting from engaging a moving hook 36 with a stationary parcel 28 will stretch spring cord 48 and also cause the same to travel, as ratchet gear 106 can turn relative to the pawl 114 in the appropriate direction. When lever 108 is in its full line position (FIG. 8), a parcel 28, engaged by hook 36, cannot move toward the aircraft 20 but the hook 36 can go out further in response to the additional pressure obtained in initially engaging the parcel 28 by hook 24. Also, first spring cord 48 is under the tension which it obtained as parcel-pickup cords 26 were paid out while cord 46 was reeved onto helical sheave 44. At the same time, second spring cord 118 was under initial pretension as pawl and ratchet means 124 were operated. Once the package is engaged, the ratchet 106 turns counterclockwise (in FIG. 8) and moves pawl 114 and lever 108 from the full line position to the dotted line position shown in FIG. 8 and the lever 108 remains in such position due to the off-center spring 112. The spring cord 48 stretches until the parcel 28 gains the speed momentum of the aircraft 20, then spring cord 48 contracts and cord 48 reeves off and turns helical sheave 44 (counterclockwise as respects the showing at the bottom of FIG. 7). This turns cross shaft 40 and, in turn, sheave 38 and this reeves parcel-pickup cord 26 onto each of the sheaves 38. The power employed in turning the cross shaft 40 (counterclockwise as respects the showing at the bottom of FIG. 7) comes from the contraction of spring cord 48 which was tensioned by driven cross shaft 40 in the opposite direction by the motor 58 paying out parcel-pickup cord 26 and further tensioned by the impact of the parcel 28 in being picked up.

Figure 4:
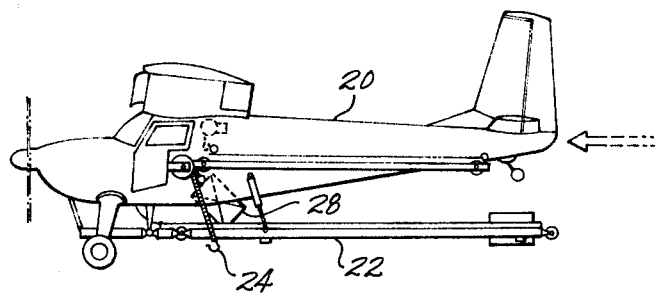
FIG. 4 is a similar view and after the parcel is engaged by a hoist to transfer the same to the aircraft.
Figure 5:
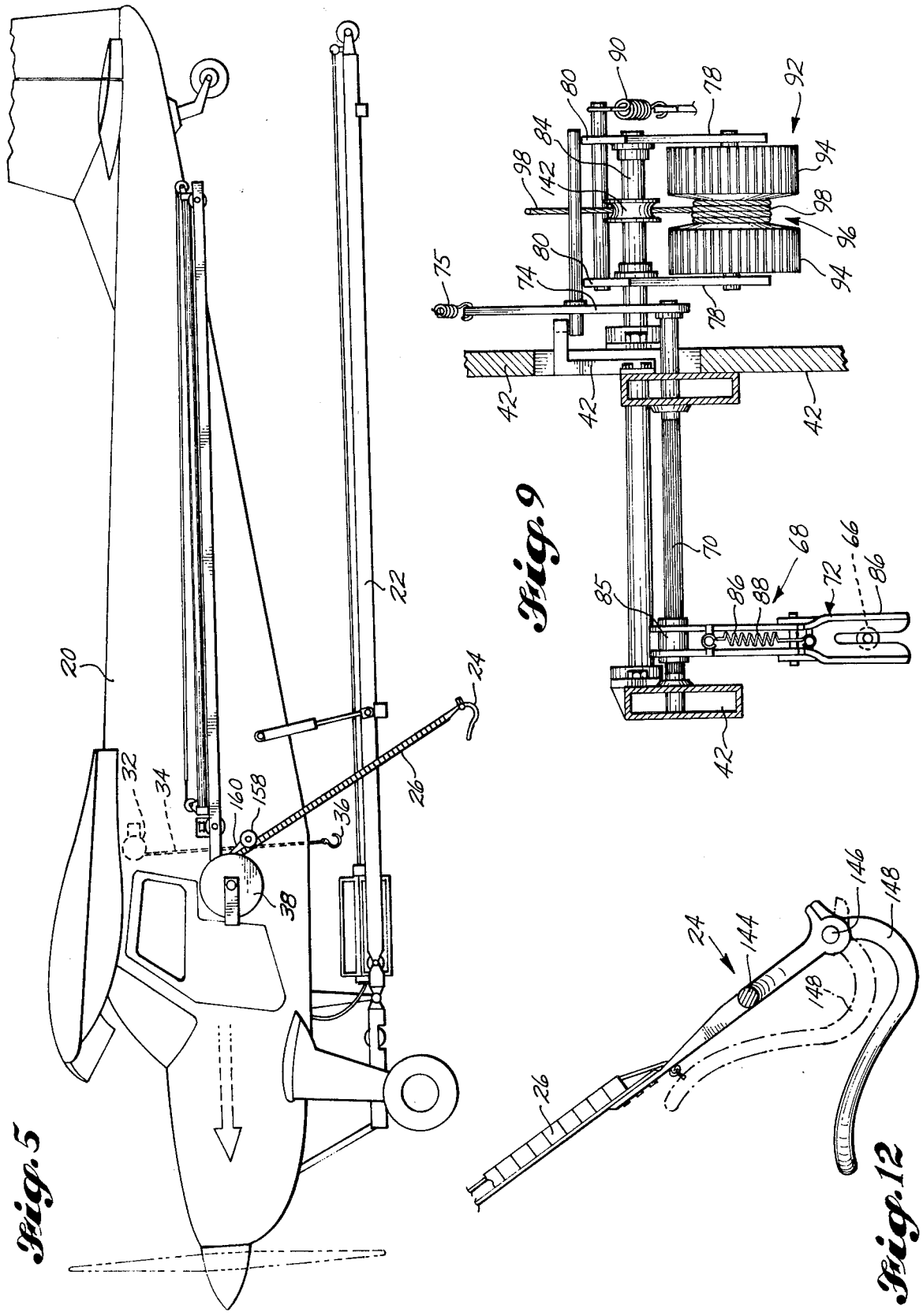
FIG. 5 is a view, on a larger scale, of an aircraft equipped with my invention.

As a parcel 28 nears aircraft 20, the portion of the cord 46 carrying ball 66 also nears the aircraft 20. When ball 66 moves lever 72, this results in gearlike members 94 and 100 (FIG. 8) moving into engagement and sheave 96 is caused to turn. Cord 98 is reeved onto sheave 96 and this causes operation of governor means 67 and piston member 130 is moved from its full line to its dotted line position in FIG. 10. The speed of travel of the piston member 130 in cylinder 128 is regulated by adjustable valves or ports 132. Thus, the parcel 28 is delivered at a suitably slow speed to adjacaent the aircraft 20. The power urging the parcel 28 toward the aircraft 20 is resilient because it is furnished by a spring cord 48. Thus, the bar parts 146 of the hook 36 functions as a stop to limit travel of the hook 36 toward the aircraft 20. While the piston member 130 was moving in cylinder member 128 to provide the desired speed-limiting action, second spring cord 118 was being tensioned to provide the power to return the piston member 130 to the full line position shown in FIG. 10 of the drawings. When the parcel 28 is suitably positioned relative the aircraft 20, the operator operates parcel-delivery means 32 and hook 36 engages a parcel 28 and moves the parcel 28 into the aircraft 20 as illustrated in FIG. 4. Then the gearlike members 94 and 100 are disengaged from each other (by lever means not shown) and second spring cord 118 moves the governor means 67 to its initial starting position.

SUMMARY

It will now be obvious that I have provided an aircraft parcel-pickup mechanism comprising a drive shaft carried by aircraft frame means such as such as cross shaft 40. Parcel-pickup cords 26 have one end portion of each thereof connected with sheave means 38 mounted on cross shaft 40 and the parcel-pickup cords 26 are reeved in a given direction about sheaves 38 and the outer end of said pickup cords 26 terminate in hook means 24 which are designed to pick up a parcel 28. The parcel-pickup cords 26 are wound onto the sheaves 38 when the cross shaft 40 is turned in a given direction and the parcel-pickup cords 26 are reeved off of said sheaves 38 when said sheave means 38 and the cross shaft 40 are turning in the opposite direction. Second sheave means 44 are preferably helical and are mounted on the cross shaft 40. First spring cord means preferably comprises cord 46, spring cord 48, and second cord 50. Such a spring cord means has a portion thereof, such as cord 50, connected with frame parts of the aircraft and remote from the helical sheave 44. The other end of the spring cord means, such as cord means 46 is connected with the helical sheave 44 and thence reeved onto the sheave 44 in the opposite direction to that of reeving of parcel-pickup cords 26 onto sheaves 38. In other words, when the cross shaft 40 is turning in a given direction, parcel-pickup cord 26 is reeving onto a sheave 38 while cord part 50 is reeving off of helical sheave 44 and vice versa. The function of the spring cord 46, 48, 50 is to drive the cross shaft 40 in one direction. Drive means such as motor 58 are provided to drive the cross shaft 40 in a direction to pay out parcel-pickup cords 26.

The first spring cord means preferably has a middle spring 48 or elastic portion with nonelastic end portions such as cord portions 46 and 50. The nonelastic end portions 46 and 50 are more suitable for wrapping around sheave means. Also, the central spring portion 48 may comprise one or a plurality of spring cords to provide maximum spring action with a minimum of length. Also, the elastic central portions 50 are weaved back and forth over a plurality of third sheaves such as sheaves 54 and 56 to provide sufficient length so that the spring cord means will bring a parcel to the aircraft 20 and with enough length to the parcel-pickup cord 26 to provide for desired maneuverability in picking up a parcel 28.

Preferably, the parcel-pickup cords 26 are provided by two cords, one on each side of the aircraft 20, and with parcel-engaging means such as a hook 24 having bar parts 144, rod 146, and U-shaped hook 148 for better engaging and better releasing from a parcel 28.

Preferably, the first spring cord means 46, 48, and 50 used to rotate sheaves 38 and bring a parcel 28 to the aircraft 20 is provided with a governor means or lineal-travel-speed-limiting means so that as a parcel 28 approaches the aircraft, speed-limiting devices are provided to control the force provided by the elastic means. More specifically, the governor means preferably includes first and second gearlike means 94 and 100 which are mounted to move into and out of engagement with each other. Such gearlike means are connected with the lineal-travel-speed-limiting means and with the spring cord means to govern the speed of the same and lever means are provided to engage and disengage said gearlike means.

In order to time the operation of the governor means or the lineal-travel-speed-limiting means, a portion of the spring cord means 46, 48, 50, such as 46, carries trigger means in the nature of ball 66 to time the operation of the governor means and the spring cord means. More specifically, the ball means 66 is carried by cord 46 and a leverage 68 is placed in the path of travel of the ball means 66. The gearlike means 100 is carried by the cross shaft 40 and the other gearlike means 94 is movable into and out of meshing relation with the gearlike means 100. The sheave 96 is carried by gearlike means 94 and the cord 98 is reeved onto and off of said sheave 96. The cord 98 is a part of a second spring cord mechanism comprising cord 96, central spring cord part 118, and cord 120. This second spring cord 98, 118, 120 connects the governor device 67 with first spring cord member 46 through gearlike members 94 and 100. Specifically, the governor device 67 is illustrated as comprising cylinder member 128 and piston member 130 mounted for travel therein and adjustable ports 132 venting air from cylinder 128.

The lever means 68 which is operated by ball 66 carried by cord 46 comprises two lever parts as links 86, with one thereof movable out of alignment and with a spring 88 connecting the two lever parts or links and moving them into alignment. The parcel-pickup cord comprises a flexible belt 152 and a plurality of blocks 150 with each block having one face connected with the belt 152 and with the opposite faces resiliently connected with each other as through cord 156, and staples 154. The blocks 150 are provided with grooves in which the cord 156 may travel and thus each parcel-pickup cord 26 can readily bend in one direction as shown in FIG. 13 and is relatively stiff against bending in the opposite direction.

Figure 6:
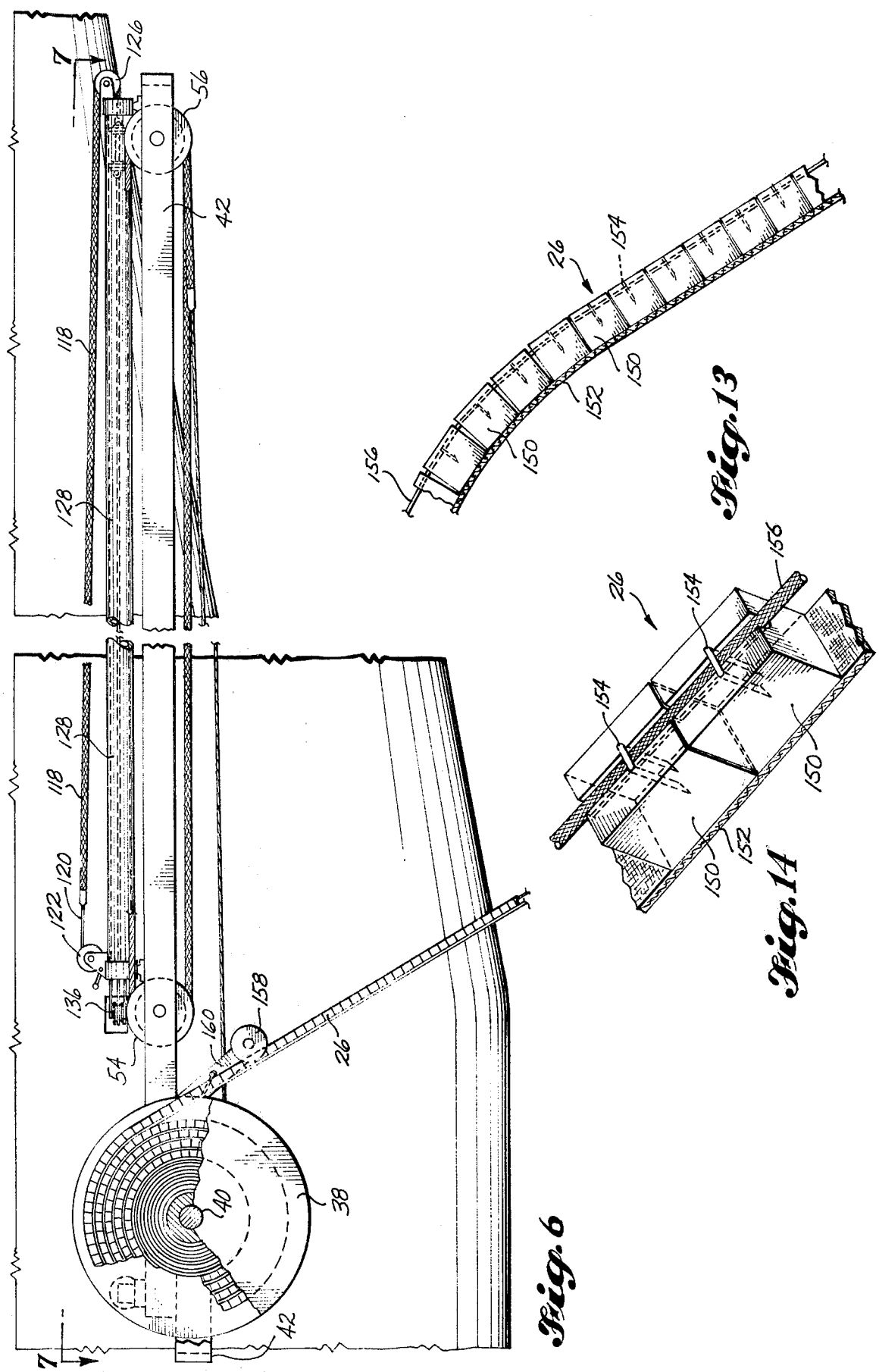
FIG. 6 is a fragmentary elevational view, on a still larger scale, showing a portion of one of the parcel-pickup cords and associated parts.
Figure 7:
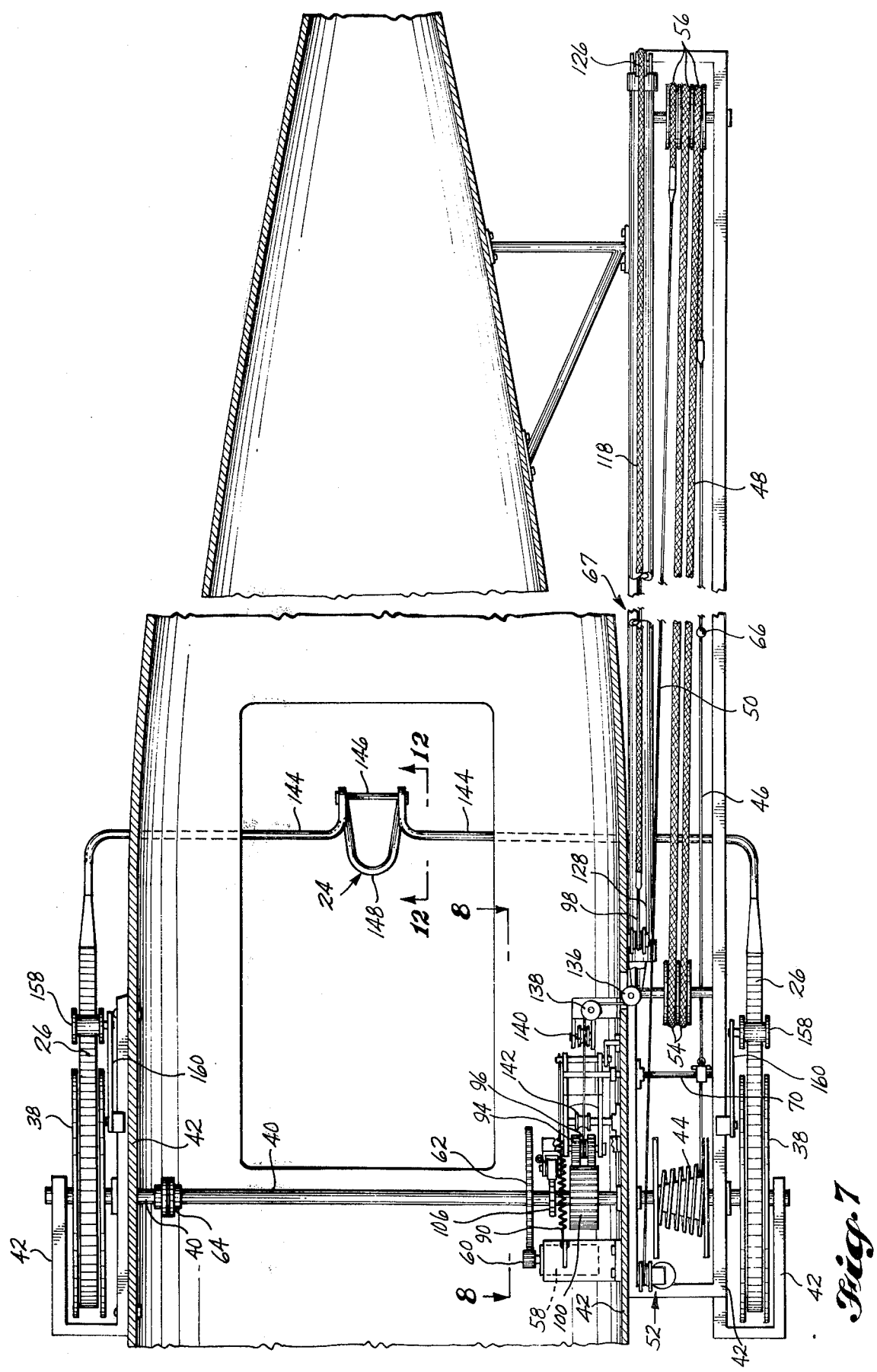
FIG. 7 is a fragmentary plan view taken substantially on broken line 7–7 of FIG. 6.

Also, the parcel-pickup cords 26 extend generally downwardly from the aircraft as illustrated in FIG. 6 and a depending arm 160 is provided with a pulley 158 and the depending arm and the weight thereof provides for tending to urge the depending parcel-pickup cords forwardly as is best illustrated in FIG. 6 of the drawings.

Obviously, changes may be made in the forms, arrangements, and dimensions of the parts of my invention without departing from the principle thereof, the above setting forth only a preferred form of embodiment of my invention.

I claim:

1. A combination aircraft parcel pickup mechanism comprising a frame carried by said aircraft; a drive shaft carried by said frame; a first sheave means fixed on said drive shaft for receiving a parcel-pickup cord means for picking up a parcel, said parcel-pickup cord means having one end portion thereof connected with said first sheave means and also being reeved onto said first sheave means when said first sheave means and said drive shaft are turning in a given direction and said parcel-pickup cord means being reeved off said first sheave means when said drive shaft and said first sheave means are turning in an opposite direction to said given direction; a second sheave fixed on said drive shaft; spring cord means having one end portion thereof connected with said frame and at a location remote from said second sheave and having the other end portion thereof connected with said second sheave and also being reeved onto said second sheave when said second sheave and said drive shaft are turning in said opposite direction and said spring cord means being reeved off of said second sheave when said drive shaft and said second sheave are turning in said given direction, the said spring cord means functioning to turn said second sheave and said drive shaft in said given direction; lineal-travel-speed-limiting means limiting the speed of travel of said spring cord means while being reeved off said second sheave and thereby limiting the speed of travel of the parcel-pickup cord means when being reeved onto said first sheave means and thereby limiting the speed of travel of a picked up parcel toward the said aircraft; drive means for turning said drive shaft and said first and second sheave fixed thereon in said opposite direction; and parcel-engaging means connected with the other end portion of said parcel-pickup cord means for directly engaging the parcel.

2. The combination of claim 1 wherein the second sheave is a tapered helical sheave.

3. The combination of claim 1, wherein said said end portions of said spring cord means are nonelastic and said spring cord means has an extended center portion which is elastic.

4. The combination of claim 3 wherein the second sheave is a helical sheave and where one of said nonelastic end portions of the spring cord means is reeved onto and off of said helical sheave.

5. The combination of claim 3, wherein a plurality of spaced apart sheaves are carried by said frame and said elastic center portion of said spring cord means is reeved over said plurality of spaced apart sheaves.

6. The combination of claim 1, wherein said first sheave means comprises two spaced apart sheaves mounted on said drive shaft; said parcel-pickup cord means comprises two spaced apart cords, each having an end portion thereof connected with and thereafter reeving onto and off of said two spaced apart sheaves, respectively; and with the parcel engaging means extending between the other end portion of said two parcel-pickup cords.

7. The combination of claim 1, wherein first and second gearlike means are provided which are mounted to move into and out of engagement with each other; means to connect one of said gearlike means to said lineal-travel-speed-limiting means, means to connect the other of said gearlike means to said drive shaft and thereby with said second sheave and said spring cord means; and lever means connected with said gearlike means to move said gearlike means into and out of engagement with each other.

8. The combination of claim 7, wherein the spring cord means carries trigger means to initiate operation of said lineal-travel-speed-limiting means.

9. The combination of claim 7, wherein a ball is carried by and traveled by said spring cord means, a lever is positioned in the path of travel of said ball, first gearlike means is carried by said drive shaft, a sheave is carried by said second gearlike means, a cord is reeved onto and off of said sheave carried by said second gearlike means, and a lineal-travel-speed-limiting device is connected with said cord, whereby the speed of rotation of said drive shaft is limited by the lineal-travel-speed-limiting device when said gearlike means are meshing.

10. The combination of claim 9, wherein said cord is a spring biased cord and, after said gearlike means have meshed and the second gearlike means has traveled a predetermined amount and said gearlike means have unmeshed, the spring biased cord will provide a force tending to return the second gearlike member toward its original position.

11. The combination of claim 9, wherein the lever means, which engages said ball comprises a first lever part, a second lever part pivotally connected to the first lever part and movable in one direction away from a point of alignment with said first lever part, stop means limiting turning movement in the other direction past the point of alignment of the second lever part which would move relative to the first lever part, and spring means interconnecting the two lever parts and urging them into alignment.

12. The combination of claim 7, wherein the lineal-travel-speed-limiting means comprises a cylinder, a piston mounted for lineal travel on said cylinder, air vents on said cylinder, and means connecting said piston with said spring cord means.

13. The combination of claim 1, wherein the parcel-pickup cord comprises a flexible belt and a plurality of blocks, each block having a face connected with said belt and with the opposite faces of each block resiliently connected with each other.

14. The combination of claim 13, wherein the opposite faces of each block are provided with grooves which are aligned with each other, a cord extends in said grooves, and the cord is connected by separate connecting means with each block, providing said flexible belt with one which readily bends in one direction but not in the opposite direction.

15. The combination of claim 1, wherein the parcel-pickup cord extends generally downwardly from said aircraft, a depending arm is hinged to the aircraft rearwardly and in close proximity of said parcel-pickup cord, and a roller is connected with a lower portion of said arm and in contact with said parcel-pickup cord and urging said parcel-pickup cord forwardly.

* * * * *